US010902234B2

(12) United States Patent
Feng et al.

(10) Patent No.: US 10,902,234 B2
(45) Date of Patent: Jan. 26, 2021

(54) IMAGE RECOGNITION METHOD AND APPARATUS

(71) Applicant: TENCENT TECHNOLOGY (SHENZHEN) COMPANY LIMITED, Shenzhen (CN)

(72) Inventors: Zhou Feng, Shenzhen (CN); Zhengshan Wu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/893,300

(22) Filed: Jun. 4, 2020

(65) Prior Publication Data
US 2020/0356742 A1 Nov. 12, 2020

Related U.S. Application Data

(63) Continuation of application No. PCT/CN2019/076107, filed on Feb. 26, 2019.

(30) Foreign Application Priority Data

Mar. 22, 2018 (CN) .......................... 2018 1 0240853

(51) Int. Cl.
G06K 7/14 (2006.01)
G06K 9/00 (2006.01)

(52) U.S. Cl.
CPC ......... G06K 7/1443 (2013.01); G06K 7/1417 (2013.01); G06K 7/1447 (2013.01); G06K 9/00201 (2013.01)

(58) Field of Classification Search
None
See application file for complete search history.

(56) References Cited

U.S. PATENT DOCUMENTS 8,385,589 B2    2/2013  Erol et al.
2009/0285444 A1*  11/2009  Erol .................... G06F 16/5846
                                                382/100

FOREIGN PATENT DOCUMENTS

| CN | 101582083 A | 11/2009 |
| CN | 103020184 A | 4/2013 |
| CN | 103956128 A | 7/2014 |
| CN | 108399349 A | 8/2018 |

OTHER PUBLICATIONS

International Search Report Issued in Application PCT/CN2019/076107 dated May 29, 2019, with English Translation, (5 pages).
Written Opinion Issued in Application PCT/CN2019/076107 dated May 29, 2019 (4 pages).

* cited by examiner

Primary Examiner — Kristy A Haupt
(74) Attorney, Agent, or Firm — Oblon, McClelland, Maier & Neustadt, L.L.P.

(57) ABSTRACT

An image recognition method of a terminal is provided. An image sensor is controlled to capture an image stream in response to receiving an image recognition trigger. A first image is extracted from the image stream. A determination is made as to whether an image type of the first image is one of an object image and a code image. One of a plurality of recognition processes is performed on a second image in the image stream according to the determined image type.

20 Claims, 11 Drawing Sheets

IMAGE RECOGNITION METHOD AND APPARATUS

RELATED APPLICATION

This application is a continuation of International Application No. PCT/CN2019/076107, filed on Feb. 26, 2019, which claims priority to Chinese Patent Application No. 201810240853.0, entitled "IMAGE RECOGNITION METHOD AND APPARATUS" filed on Mar. 22, 2018. The entire disclosures of the prior applications are hereby incorporated by reference in their entirety.

FIELD OF THE TECHNOLOGY

This application relates to the field of Internet application technologies, such as image recognition.

BACKGROUND OF THE DISCLOSURE

With continuous development of mobile Internet applications, instant image recognition is more widely applied. The instant image recognition usually includes object image recognition for recognizing an object included in an image, and code image recognition for recognizing a graphic code included in an image. The graphic code herein is a graphic identifier including a plurality of symbols arranged according to a specific encoding rule for expressing a set of information. A common graphic code includes a barcode, a two-dimensional barcode, or the like. Generally, an object image recognition function and a code image recognition function correspond to different recognition entries. After a user operates a recognition entry corresponding to the object image recognition function, a procedure of performing object recognition on an image is triggered, to recognize an object included in the image; and after the user operates a recognition entry corresponding to the code image recognition function, a procedure of performing code image recognition on an image is triggered, to recognize code content carried in a graphic code included in the image

SUMMARY

Embodiments of this application include an image recognition method and apparatus, to simplify a user operation for object recognition and code image recognition, thereby improving efficiency of the user operation.

An image recognition method of a terminal according to some embodiments is provided. An image sensor is controlled to capture an image stream in response to receiving an image recognition trigger. A first image is extracted from the image stream. A determination is made as to whether an image type of the first image is one of an object image and a code image. One of a plurality of recognition processes is performed on a second image in the image stream according to the determined image type.

An image recognition apparatus according to some embodiments is provided. The image recognition apparatus includes processing circuitry configured to control an image sensor to capture an image stream in response to receiving an image recognition trigger, and extract a first image from the image stream. The processing circuitry is configured to determine whether an image type of the first image is one of an object image and a code image. The processing circuitry is configured to perform one of a plurality of recognition processes on a second image in the image stream according to the determined image type.

A computer device of some embodiments may include a processor and a memory, the memory storing at least one instruction, at least one program, a code set, or an instruction set, and the at least one instruction, the at least one program, the code set, or the instruction set being loaded and executed by the processor to implement the foregoing image recognition method.

A computer-readable storage medium of some embodiments may store at least one instruction, at least one program, a code set, or an instruction set, and the at least one instruction, the at least one program, the code set, or the instruction set being loaded and executed by a processor to implement the foregoing image recognition method. For example, a non-transitory computer-readable storage medium storing instructions which when executed by a processor cause the processor to perform an image recognition method is provided. An image sensor is controlled to capture an image stream in response to receiving an image recognition trigger. A first image is extracted from the image stream. A determination is made as to whether an image type of the first image is one of an object image and a code image. One of a plurality of recognition processes is performed on a second image in the image stream according to the determined image type.

Through the solutions shown in this application, a user may trigger recognition on two types of images, namely, an object image and a code image, through the same operation without respectively setting entry controls for the two types of images. That is, through the same operation of enabling image recognition, the user not only can invoke an image collection component to shoot and recognize an object, but also can invoke the image collection component to shoot and recognize a graphic code, without switching between two entry controls, so that operation steps of the user during switching for recognition on images of different types can be simplified, thereby improving efficiency of switching for recognition on images of different types.

It is to be understood that the above general descriptions and the following detailed descriptions are merely for exemplary and explanatory purposes, and cannot limit this application.

BRIEF DESCRIPTION OF THE DRAWINGS

The accompanying drawings, which are incorporated herein and constitute a part of this specification, illustrate embodiments consistent with this application and, together with the specification, serve to explain the principles of this application.

DESCRIPTION OF EMBODIMENTS

Exemplary embodiments are described in detail herein, and examples of the exemplary embodiments are shown in the accompanying drawings. When the following descriptions relate to the accompanying drawings, unless otherwise indicated, same numbers in different accompanying drawings represent same or similar elements. The following implementations described in the following exemplary embodiments do not represent all implementations that are consistent with this application. The implementations are merely examples of apparatuses and methods that are described in the appended claims and that are consistent with some aspects of this application.

Figure 1:
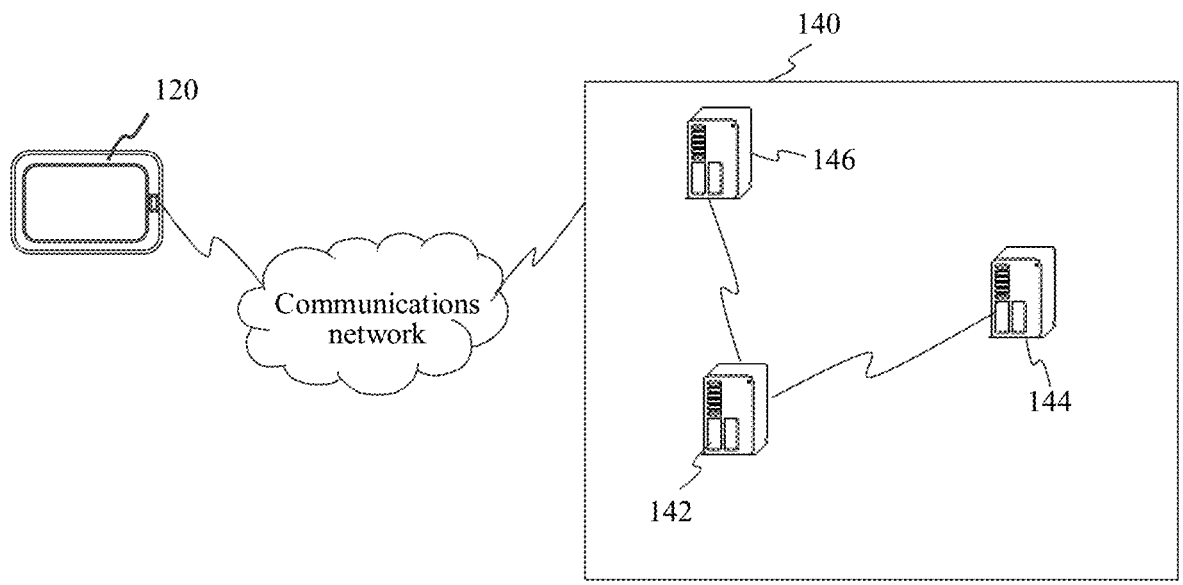
FIG. 1 is a schematic structural diagram of an image recognition system according to an exemplary embodiment.

FIG. 1 is a schematic structural diagram of an image recognition system according to an exemplary embodiment. The system includes: a terminal 120 (or a plurality of the terminal 120) and a server cluster 140.

The terminal 120 may be a mobile phone, a tablet computer, an e-book reader, smart glasses, a smartwatch, a moving picture experts group audio layer III (MP3) player, a moving picture experts group audio layer IV (MP4) player, a laptop portable computer, a desktop computer, or the like.

The terminal 120 correspondingly includes image collection component. The image collection component may be a part of the terminal 120. For example, the image collection component may be a built-in camera of the terminal 120. Alternatively, the image collection component may be connected to the terminal 120 as a peripheral device of the terminal 120.

The terminal 120 is connected to the server cluster 140 through a communications network. In some embodiments, the communications network is a wired network or a wireless network.

In the embodiments of this application, the terminal 120 may locally perform recognition on an image collected by the image collection component, or the terminal 120 may upload the image collected by the image collection component to the server cluster 140. The server cluster 140 performs recognition on the image uploaded by the terminal 120 and returns a recognition result to the terminal 120. The foregoing procedure of performing recognition on the image may be a procedure of recognizing an object included in the image, or recognizing and parsing a graphic code included in the image.

The foregoing graphic code may be a pattern, such as a barcode or a two-dimensional barcode, capable of carrying additional information.

The server cluster 140 includes one server, a plurality of servers, a virtualization platform, or a cloud computing service center.

In some embodiments, the server cluster 140 includes a server configured to implement an object image recognition platform 142. The object image recognition platform 142 may recognize whether there is an object in the image uploaded by the terminal 120, and return a recognition result to the terminal 120.

In some embodiments, the server cluster 140 further includes a server configured to implement a code image recognition platform 144. The code image recognition platform 144 may recognize whether there is a graphic code in the image uploaded by the terminal 120, and return a recognition result to the terminal 120.

In some embodiments, the server cluster 140 may further include a server of a recognition algorithm management platform 146. The recognition algorithm management platform 146 may maintain and update image recognition algorithms respectively used in the object image recognition platform 142 and the code image recognition platform 144.

The servers configured to implement the object image recognition platform 142, the code image recognition platform 144, and the recognition algorithm management platform 146 may be servers independent of each other; or two of the object image recognition platform 142, the code image recognition platform 144, and the recognition algorithm management platform 146 may be implemented in the same server, and the other platform may be implemented in another server; or the same server is configured to implement the foregoing three platforms. When the foregoing three platforms are implemented in two or three servers, the two or three servers are connected to each other through a communication network.

In some embodiments, the system may further include a management device (not shown in FIG. 1). The management device is connected to the server cluster 140 through a communications network. In some embodiments, the communications network is a wired network or a wireless network.

In some embodiments, a standard communications technology and/or protocol is used for the wireless network or the wired network described above. The network is usually the Internet, but may be any other network, including but not limited to a local area network (LAN), a metropolitan area network (MAN), a wide area network (WAN), a mobile, wired, or wireless network, or any combination of a dedicated network or a virtual dedicated network. In some embodiments, technologies and/or formats, such as hypertext markup language (HTML) and extensible markup language (XML), are used to represent data exchanged through a network. In addition, encryption technologies, such as Secure Socket Layer (SSL), Transport Layer Security (TLS), Virtual Private Network (VPN), and Internet Protocol Security (IPsec), are used to encrypt all or some links. In some other embodiments, custom and/or dedicated data communication technologies may alternatively be used in place of or in addition to the foregoing data communication technologies.

Figure 2:
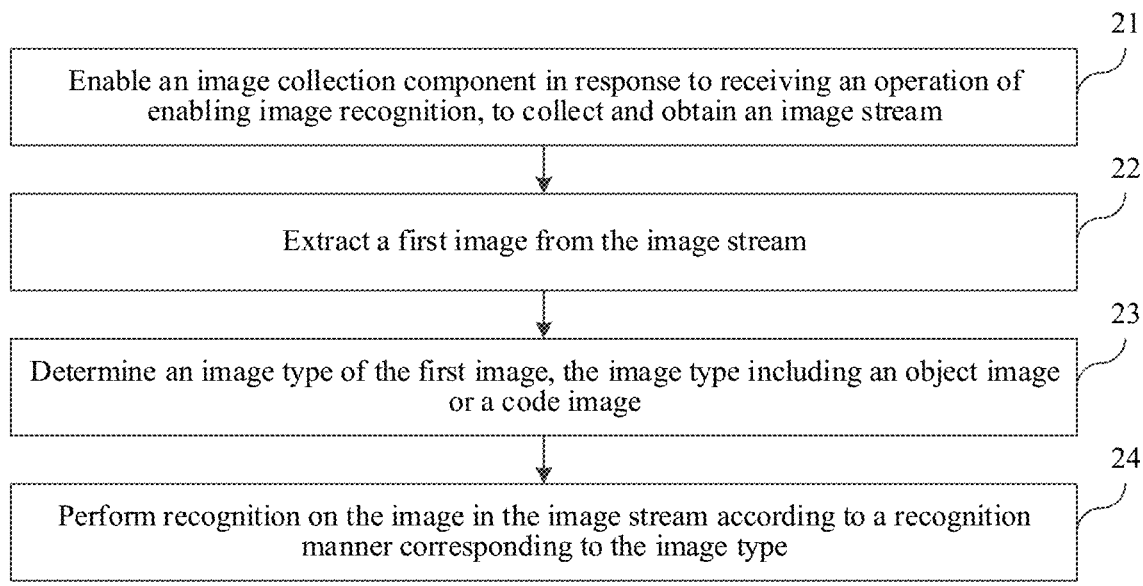
FIG. 2 is a flowchart of an image recognition method according to an exemplary embodiment.

FIG. 2 is a flowchart of an image recognition method according to an exemplary embodiment. The image recognition method may be used in a terminal. For example, the method may be used in the terminal 120 shown in FIG. 1. As shown in FIG. 2, the image recognition method may include the following steps.

In step 21, an image collection component is enabled in response to receiving an operation of enabling image recognition, to collect and obtain an image stream. For example, an image sensor is controlled to capture an image stream in response to receiving an image recognition trigger.

In this embodiment of this application, a user may trigger recognition on two different types of images, namely, an object image and a code image, through the same operation. For example, the user may trigger recognition on two different types of images, namely, the object image and the code image, through the same recognition entry control, or the user may trigger recognition on two different types of images, namely, the object image and the code image, through the same operation that does not rely on a recognition entry control. Herein, the code image is an image in which a graphic code is presented in a picture.

When the user triggers image recognition through the recognition entry control, for object image recognition and graphic code recognition, only a single recognition entry control needs to be set in an application interface displayed in the terminal. The user may simultaneously trigger, through the recognition entry control, the two functions of performing object recognition and graphic code recognition on the object image.

Figure 3:
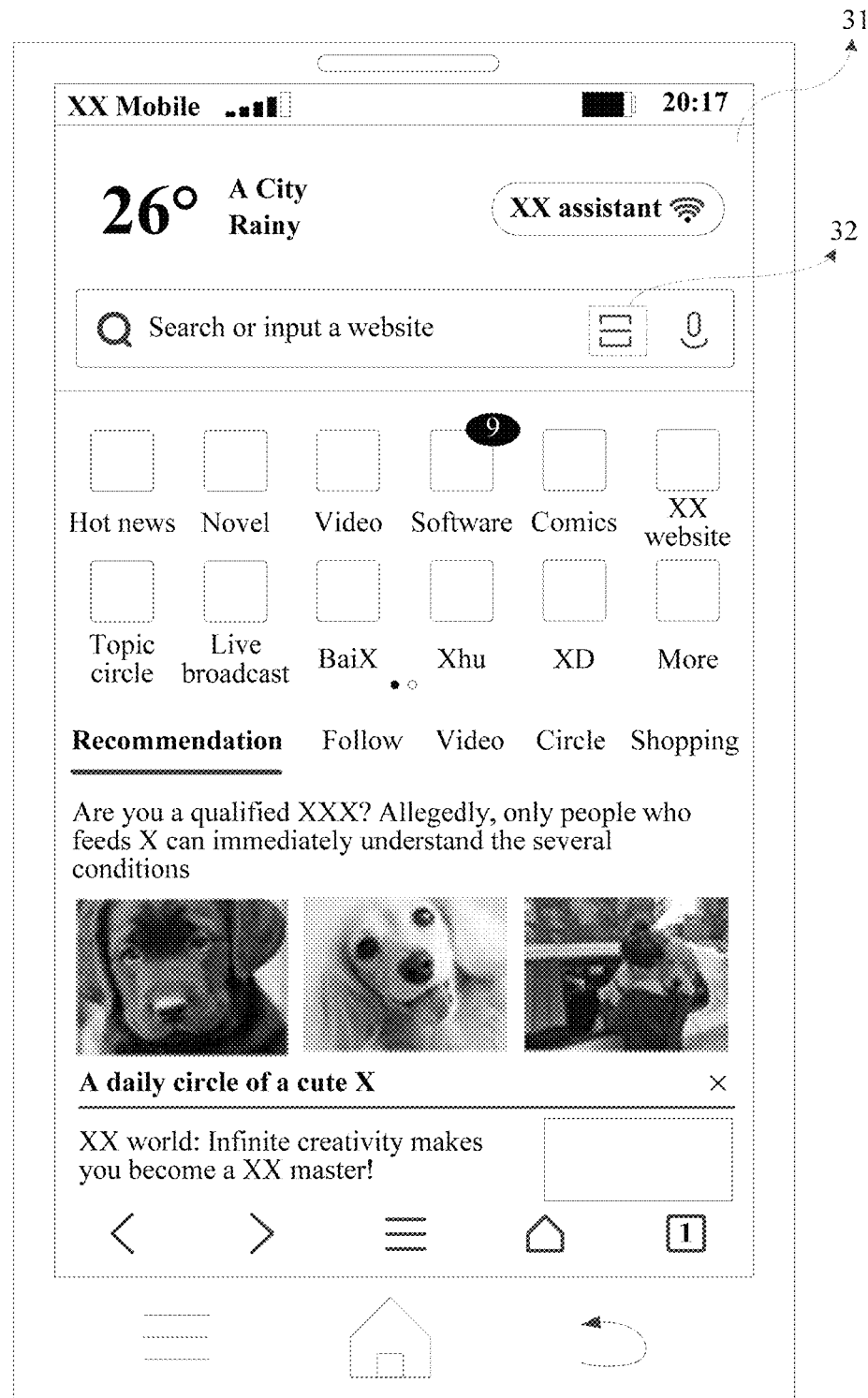
FIG. 3 is a schematic diagram of presenting a recognition entry control included in the embodiment of FIG. 2.

For example, FIG. 3 is a schematic diagram of presenting a recognition entry control included in this embodiment of this application. As shown in FIG. 3, in an application program interface 31, only one recognition entry control 32 is included. The recognition entry control corresponds to both an object image recognition function and a graphic code recognition function provided by an application program corresponding to the application program interface 31.

In another possible implementation, when triggering image recognition through an operation that does not rely on a recognition entry control, the user may trigger an object image recognition function and a graphic code recognition function in a specified page (e.g., a page of a browser) through an operation of sliding the page (e.g., pulling down, left sliding, or right sliding the page). Alternatively, the user may trigger the object image recognition function and the graphic code recognition function through an operation such as clicking a shortcut, voice control or shaking.

In step 22, a first image is extracted from the image stream.

In step 23, an image type of the first image is determined, the image type including an object image or a code image. For example, a determination is made as to whether an image type of the first image is one of an object image and a code image.

The object image may be an image including an actual object. For example, the actual object may be a cup, a potted plant, a painting, a person, an animal, or the like. The code image may be an image including a graphic code.

In this embodiment of this application, before performing image recognition and/or graphic code recognition on the image collected by the image collection component, the terminal first extracts the first image from the image stream collected by the image collection component. The first image may be one frame of an image, or the first image may include two or more frames of images. The terminal preliminarily determines whether the first image is an object image or a code image according to the first image.

In step 24, recognition on the image in the image stream is performed according to a recognition manner corresponding to the image type. For example, one of a plurality of recognition processes is performed on a second image in the image stream according to the determined image type.

In this embodiment of this application, after preliminarily determining whether the first image is an object image or a code image, the terminal selects a recognition manner (e.g., object recognition or graphic code recognition) corresponding to the image type of the first image, and performs recognition on the image in the image stream collected and obtained by the image collection component, to obtain a recognition result.

Through the solution shown in FIG. 2, a user only needs to perform an operation of enabling image recognition to trigger recognition on two types of images, namely, an object image and a code image, without respectively setting entry controls for the two types of images. That is, through the operation of enabling image recognition, the user not only can invoke an image collection component to shoot and recognize an object, but also can invoke the image collection component to shoot and recognize a graphic code, without switching between two entry controls, so that operation steps of the user during switching for recognition on images of different types can be simplified, thereby improving efficiency of switching for recognition on images of different types.

Because the determined image type of the first image is not necessarily accurate, when the image type of the first image is wrongly determined, a procedure of performing recognition on the image stream according to the recognition manner corresponding to the image type may consequently fail. To improve accuracy of image recognition, in this application, an error tolerance rate of recognition may be enhanced through a solution shown in FIG. 4.

Figure 4:
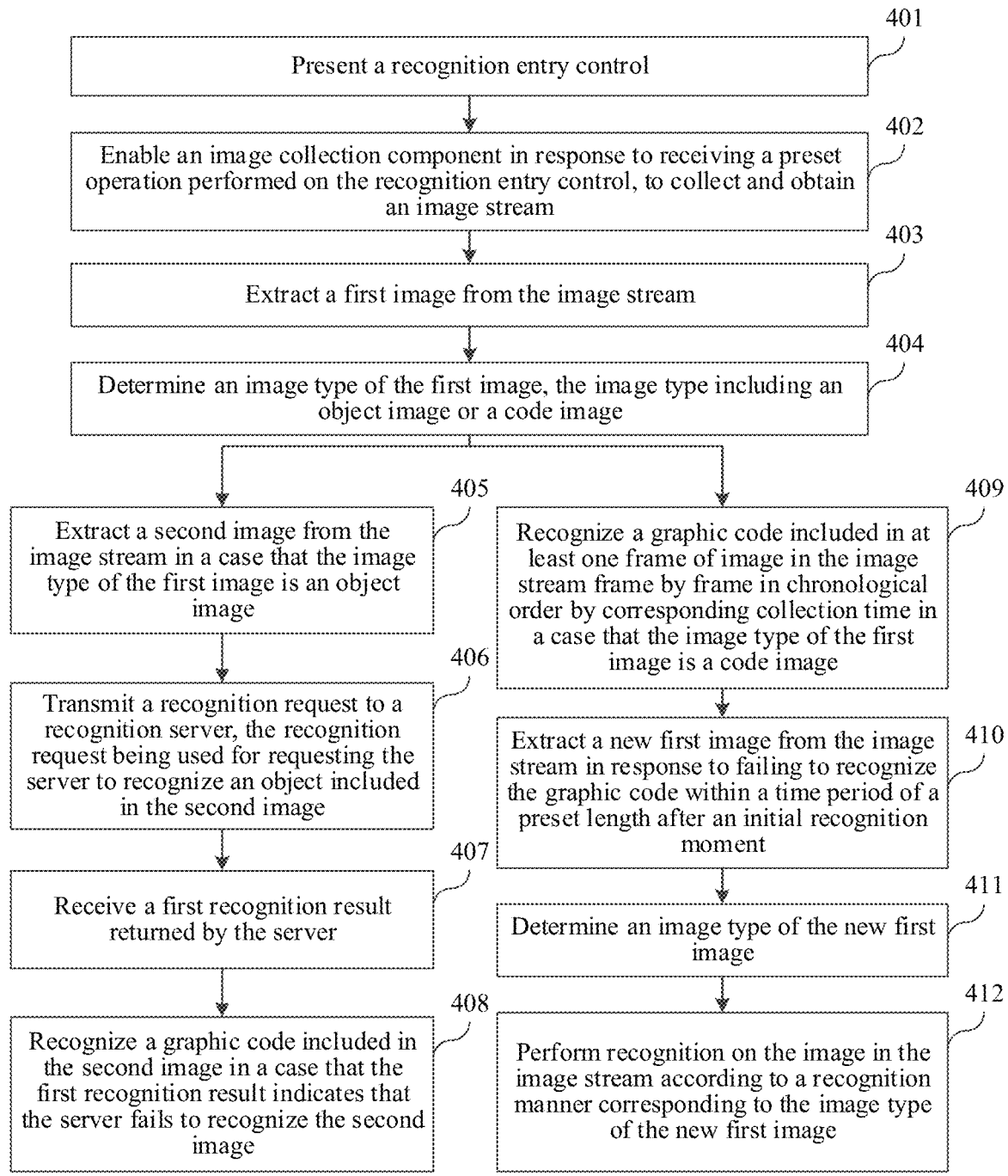
FIG. 4 is a flowchart of an image recognition method according to an exemplary embodiment.

FIG. 4 is a flowchart of an image recognition method according to an exemplary embodiment. The image recognition method may be used in a terminal. For example, the method may be used in the terminal 120 shown in FIG. 1. Using an example in which recognition of two types of images is triggered through one recognition entry control, as shown in FIG. 4, the image recognition method may include the following steps.

In step 401, a recognition entry control is presented.

In this embodiment of this application, when running an application program simultaneously providing an object recognition function and a graphic code recognition function, the terminal may present an application program interface including a recognition entry control, and the recognition entry control may implement the two functions, namely, the object recognition function and the graphic code recognition function. The application program interface may be shown in FIG. 3, and is not described herein again.

In step 402, an image collection component is enabled in response to receiving a preset operation performed on the recognition entry control, to collect and obtain an image stream.

In this embodiment of this application, when the user needs to recognize an object or a code image, the user may trigger a terminal through a click or an operation of another type, to enable the image collection component to collect the image stream. When collecting the image stream, the image collection component may present an image view-finding interface, the image view-finding interface being an interface used for displaying an image obtained through real-time view-finding by the image collection component. Frames of images displayed in the image view-finding interface constitute the image stream.

In step 403, a first image is extracted from the image stream.

In this embodiment of this application, after enabling the image collection component to collect the image stream, the terminal first extracts one frame of an image or a plurality of frames of images from the image stream as the first image. For example, the terminal may extract the first image from the image stream at a preset sampling frequency; or the terminal may randomly extract at least one frame of an image as the first image.

In step 404, an image type of the first image is determined, the image type including an object image or a code image.

In this embodiment of this application, when determining the image type of the first image, the terminal may obtain a probability that the first image is a code image. When the probability is greater than a preset probability threshold, the terminal determines that the first image is a code image, and when the probability is less than or equal to the preset probability threshold, the terminal determines that the first image is an object image.

For example, using an example in which the probability threshold is 95%, the terminal first detects a probability that the first image is a code image. If the probability that the first image is a code image is greater than 95%, the terminal determines that the first image is a code image, and on the contrary, if the probability that the first image is a code image is less than or equal to 95%, the terminal determines that the first image is an object image.

In this embodiment of this application, the terminal may recognize the probability that the first image is a code image by using a graphic code recognition algorithm. The graphic code recognition algorithm may include a barcode recognition algorithm, a two-dimensional barcode recognition algorithm, and the like.

The probability threshold may be a threshold preset by a developer.

In some embodiments, when obtaining the probability that the first image is a code image, the terminal may alternatively input the first image into an image classification model, to obtain the probability that the first image is a code image, the image classification model being a machine learning model obtained by training through a training sample, the training sample including a sample image pre-labeled as a code image.

In this embodiment of this application, the terminal may alternatively obtain the probability that the first image is a code image through a machine learning model (e.g., the image classification model). For example, the developer may pre-label several training samples, where each training sample is an image including a graphic code. The developer inputs the several training samples into a preset machine learning model (e.g., a convolutional neural network model) to perform machine learning, to obtain the image classification model. When step 404 is performed, after the terminal inputs the first image into the image classification model, the image classification model may obtain a probability that the first image includes a graphic code (e.g., the probability that the first image is a code image) according to image content of the first image.

In another possible implementation, after the terminal inputs the first image into the image classification model, the image classification model may alternatively output a classification result indicating whether the first image is a code image. When the classification result indicates that the first image is a code image, the terminal determines that the image type of the first image is a code image, and when the classification result indicates that the first image is not a code image, the terminal may determine that the image type of the first image is an object image.

In step 405, a second image is extracted from the image stream in a case that the image type of the first image is an object image.

In a possible implementation, in a case that the image type of the first image is an object image, the terminal may obtain, from the image stream, a target image satisfying a preset extraction condition as the second image.

In some embodiments, the preset extraction condition includes at least one of the following conditions: (i) a difference value between the target image and a reference image is less than a preset difference threshold (e.g., the difference value being used for indicating a difference between two frames of images), and the reference image being an image that is in the image stream and that is located at a preset relative location of the target image; (ii) ambient light luminance at a collection moment corresponding to the target image is greater than a preset luminance threshold; (iii) terminal acceleration at the collection moment corresponding to the target image is less than a preset acceleration threshold; and (iv) the collection moment corresponding to the target image is after a first moment, and duration between the collection moment and the first moment is greater than a preset duration threshold, the first moment being a moment at which the first image is collected.

The difference threshold, the luminance threshold, the acceleration threshold, and the duration threshold may be thresholds preset by a developer.

In an actual application, in the image stream collected by the terminal through the image collection component, not all the images are suitable for image recognition. In this embodiment of this application, the terminal may dynamically obtain, according to the preset extraction condition, a second image suitable for image recognition. For example, the terminal may trigger extracting the second image according to the preset extraction condition. For example, the terminal may control the image collection component to continuously collect the image stream (Preview Data) through a driver of the image collection component. A format of the image stream may be an YUV (which is also referred to as YCrCb, and is a color encoding manner, where Y represents luminance or luma, U and V represents chrominance or chroma) format, for example, an YUV9 format, an YUV411 format, or an YUV420 format. Alternatively, the format of the image stream may be an RGB (Red, Green, Blue) format, for example, an RGB4 format, an RGB8 format, or an RGB32 format. The format of the image stream is not limited in this embodiment of this application.

If an image collected at a specific moment satisfies the following conditions, extracting the image as the second image is triggered:

(1) Neighboring Frame Difference Condition

In this embodiment of this application, the terminal may detect a moving target according to a difference between an RGB pixel of the currently collected image and an RGB pixel of an adjacent frame of an image or an alternate frame of an image (e.g., a change between two frames of images), to effectively handle, in real time, interference caused by a change of movement of an object on scanning and recognition.

An inter-frame difference formula may be represented as follows:

$$D_t(i,j) = |C_t(i,j) - C_{t-s}(i,j)|$$

s is a quantity of interval frames, and usually, a value of s may be from 1 to 3. $C_t(i, j)$ is defined as an RGB pixel of the $t^{th}$ frame of an image in the image stream, $C_{t-s}(i, j)$ is an RGB pixel of the $(t-s)^{th}$ frame of an image in the image stream, and $D_t(i, j)$ is foreground noise between the $t^{th}$ frame of the image and the $(t-s)^{th}$ frame of the image in the image stream.

Using an example in which the $t^{th}$ frame of the image is a target image, and the $(t-s)^{th}$ frame of the image is a reference image corresponding to the target image, in this embodiment of this application, the terminal may obtain $D_t(i, j)$ as a difference value between the $t^{th}$ frame of the image and the $(t-s)^{th}$ frame of the image. If $D_t(i, j)$ is greater than or equal to a preset difference threshold, it indicates that the difference between the two images is relatively large, which is possibly because the user is adjusting a shooting angle or a shooting direction within this period of time. In this case, the $t^{th}$ frame of the image does not satisfy the neighboring frame difference condition, the terminal can skip the $t^{th}$ frame of the image and continues to determine whether another frame satisfies the neighboring frame difference condition. Otherwise, if $D_t(i, j)$ is less than the preset difference threshold, it indicates that the difference between the two images is relatively small, which is possibly because the user has finished adjusting the shooting angle or the shooting direction within this period of time. In this case, the $t^{th}$ frame of the image satisfies the neighboring frame difference condition, and the terminal may obtain the $t^{th}$ frame of the image as the second image.

The foregoing example in which the $t^{th}$ frame of the image is the target image, and the $(t-s)^{th}$ frame of the image is the reference image corresponding to the target image is used for description, and in an actual application, alternatively, the $(t-s)^{th}$ frame of the image may be used as the target image, and the $t^{th}$ frame of the image may be used as the reference image corresponding to the target image.

(2) Lighting Condition

In this embodiment of this application, the terminal may obtain a luminance value of surrounding ambient light through a light sensor. When the luminance of the ambient light is relatively low, it may be considered that in this case, a picture of the image collected through the image collection component is relatively dark, and does not satisfy the lighting condition required for image recognition. In this case, the terminal may ignore the image, and continue to collect a next frame of an image. The terminal obtains the collected image as the second image until the luminance of the ambient light is greater than a preset luminance threshold.

(3) Terminal Movement State Condition

In this embodiment of this application, the terminal may obtain acceleration of the terminal in an x-axis, a y-axis, and a z-axis in a space coordinate system through built-in acceleration sensors. If values of the acceleration of the terminal in all or some of the directions are greater than an acceleration threshold at a moment, it is possible that the user is adjusting the shooting angle or the shooting direction of the image collection component. In this case, the picture of the image collected by the image collection component may be relatively blurry, and in this case, the collected image usually does not include an object that the user intends to recognize, that is, in this case, the collected image does not satisfy the terminal movement state condition. The terminal may skip the current image, and continue to collect a next frame of an image. When the acceleration of the terminal in all the three directions, namely, the x-axis, the y-axis, and the z-axis, in the space coordinate system is less than or equal to corresponding acceleration thresholds at a specific moment, it is possibly because the user has finished adjusting the shooting angle or the shooting direction within this period of time. In this case, the terminal may obtain the image collected at this moment as the second image.

(4) Duration Threshold Condition

In an actual application, a user can aim a lens of the image collection component at a to-be-recognized object for a period of time after the terminal enables the image acquisition component. Therefore, in this embodiment of this application, when a duration in which the image collection component in the terminal collects the image stream exceeds a duration threshold (e.g., 3 seconds), the terminal may consider that the subsequently collected images satisfy the duration threshold condition, and, and collect the second image from the subsequently collected images.

In this embodiment of this application, the foregoing four conditions may be separately used, that is, in the image stream collected by the image collection component of the terminal, when a specific frame of an image satisfies any one of the foregoing four conditions, this frame of the image may be extracted as the second image.

Alternatively, the foregoing four conditions may be used in combination, that is, in the image stream collected by the image collection component of the terminal, only when a specific frame of an image satisfies both or all of at least two specified conditions of the foregoing four conditions, this frame of the image can be extracted as the second image.

For example, using an example in which only an image satisfying all of the foregoing four conditions can be extracted as the second image, a formula of triggering extracting the second image may be as follows:

$$f_t = \begin{cases} 1, & D_t(i, j) < d, L_t < 1, M_t < m, \text{ and } S_t < s; \\ 0, & \text{other} \end{cases}.$$

$D_t(i, j)$ is foreground noise between the $t^{th}$ frame of the image and the $(t-s)^{th}$ frame of the image in the image stream, and d is a difference threshold; Lt is ambient light luminance collected by the light sensor when the $t^{th}$ frame of the image in the image stream is collected, and 1 is a luminance threshold; $M_t$ is an acceleration value obtained by the acceleration sensor in the terminal when the $t^{th}$ frame of the image in the image stream is collected, and m is an acceleration threshold; $S_t$ is duration from when the image collection component in the terminal starts to collect images to when the $t^{th}$ frame of the image in the image stream is collected, and s is a duration threshold. $f_t=1$ represents that the terminal can extract the $t^{th}$ frame of the image in the image stream as the second image, and $f_t=0$ represents that the terminal cannot extract the $t^{th}$ frame of the image in the image stream as the second image.

Through the solution shown in this embodiment of this application, the terminal may trigger a dynamic scanning behavior (e.g., the terminal automatically extracts the second image used for object recognition) through diversified trigger conditions, to more accurately satisfy an exception of the user, and prevent incorrect recognition, thereby improving a recognition effect and recognition accuracy. On a terminal side, the foregoing various conditions may be easily obtained or calculated, and recognition efficiency and accuracy may be greatly improved by using the conditions in combination.

In another possible implementation, when the image type of the first image is an object image, the terminal may alternatively present an image view-finding interface, the image view-finding interface being an interface used for displaying an image obtained through real-time view-finding by the image collection component; determine a focusing parameter of the image collection component according to a focusing operation performed in the image view-finding interface; and extract an image collected by the image collection component according to the focusing parameter as the second image.

In an actual application, when the image stream is collected through the image collection component, because an automatic focusing function of the image collection component does not necessarily enable the image collection component to accurately focus on the object that the user intends to recognize, definition of the object that the user intends to recognize and that is included in the collected image is not high enough, and consequently, accuracy of subsequent object recognition is affected. Therefore, in this embodiment of this application, the terminal may be actively triggered by the user to statically obtain the second image.

Figure 5:
FIG. 5 is a schematic diagram of an image of default focusing included in the embodiment of FIG. 4.

For example, FIG. 5 is a schematic diagram of an image of default focusing included in this embodiment of this application. As shown in FIG. 5, in a camera preview interface (e.g., the foregoing image view-finding interface), a plurality of objects, such as a potted plant and a book, are displayed. When the user does not actively perform an operation, the image collection component performs focusing according to a default focusing parameter, and the image shown in FIG. 5 is presented in the camera preview interface. In the state shown in FIG. 5, if the user intends to capture a best shot, for example, intends to recognize the potted plant therein, the user may tap a location of the potted plant in a screen. In this case, the image collection component displays a virtual icon for focusing 51 in the camera preview interface, to indicate a touch location of the user.

Figure 6:
FIG. 6 is a schematic diagram of an image of active focusing included in the embodiment of FIG. 4.

FIG. 6 is a schematic diagram of an image of active focusing included in this embodiment of this application. As shown in FIG. 6, based on FIG. 5, after the terminal receives a tap operation of the user on the location of the potted plant and displays the virtual icon for focusing, a camera application is triggered to start to perform automatic focusing (StartFocus) according to a focus parameter corresponding to the virtual icon for focusing, and select a frame of a clear image for display after a successful callback of the camera application (onAutoFocus).

Figure 7:
FIG. 7 is a schematic diagram of a to-be-recognized image included in the embodiment of FIG. 4.

FIG. 7 is a schematic diagram of a to-be-recognized image included in this embodiment of this application. As shown in FIG. 7, based on FIG. 6, an image collected by the terminal after refocusing is used as the second image on which object recognition is to be performed.

In the solutions shown in this application, the dynamic and static obtaining procedures of the second image may be combined. For example, in an actual application, when the user does not actively trigger focusing, the terminal dynamically obtains the second image suitable for image recognition by using a preset extraction condition, and when the user actively triggers focusing, the foregoing dynamic obtaining procedure may be interrupted, and switched to statically obtaining the second image.

In step 406, a recognition request is transmitted to a recognition server, the recognition request being used for requesting the server to recognize an object included in the second image.

In this embodiment of this application, the terminal may perform object recognition by using a server in a cloud. That is, the terminal may add the second image to the recognition request, and transmit the recognition request to the server. The server recognizes the object included in the second image by using a preset recognition algorithm.

In step 407, a first recognition result returned by the server is received.

In this embodiment of this application, when recognizing the object included in the second image, the server may return a first recognition result including object information corresponding to the recognized object to the terminal. When failing to recognize the object included in the second image, the server may return a first recognition result including a recognition failure indication to the terminal.

If the first recognition result includes the object information corresponding to the recognized object, the terminal may present the object information after receiving the first recognition result.

In this embodiment of this application, only an example in which the object image is recognized by using a server is used for description. In an actual application, the object included in the second image may be alternatively recognized by the terminal.

In step 408, a graphic code included in the second image is recognized in a case that the first recognition result indicates that the server fails to recognize the second image.

For example, when the first recognition result received by the terminal includes the recognition failure indication, the terminal may determine that the second image does not include an object, that is, the second image may be a code image. In this case, the terminal may recognize the second image according to a preset graphic code recognition algorithm, to recognize whether the second image includes a graphic code, and parses, when the second image includes a graphic code, code content included in the graphic code.

If it is recognized that the second image includes a graphic code, the terminal may further present the code content included in the graphic code.

In another possible implementation, when the first recognition result indicates that the server fails to recognize the second image, the terminal may alternatively skip performing graphic code recognition on the second image, and instead, recognize a graphic code included in at least one frame of an image in the image stream frame by frame in chronological order by corresponding collection time.

In step 409, recognition is performed on a graphic code included in at least one frame of an image in the image stream frame by frame in chronological order by corresponding collection time in a case that the image type of the first image is a code image.

In this embodiment of this application, when the terminal determines that the image type of the first image is a code image, it may be considered that the user intends to recognize the graphic code. In this case, the terminal may perform recognition on at least one frame of an image in the image stream frame by frame according to the preset graphic code recognition algorithm, to recognize whether the frames of images included in the image stream include a graphic code, and parse, when a graphic code is included, code content included in the graphic code.

An extraction manner of the at least one frame of the image in the image stream is similar to the foregoing extraction manner of the second image, and details are not described herein again.

If the terminal recognizes that the at least one frame of the image in the image stream includes a graphic code, the terminal may further present the code content included in the graphic code.

In this embodiment of this application, only an example in which the terminal recognizes the code image is used for description. In an actual application, the terminal may alternatively upload the at least one frame of the image in the image stream to a server, and the server recognizes the graphic code included in the at least one frame of the image.

In step 410, a new first image is extracted from the image stream in response to failing to recognize the graphic code within a time period of a preset length after an initial recognition moment.

In step 411, an image type of the new first image is determined.

In step 412, recognition is performed on the image in the image stream according to a recognition manner corresponding to the image type of the new first image.

The solution shown in the foregoing steps 410 to 413 is similar to the solution of steps 401 to 409, and details are not described herein again.

In this embodiment of this application, if the image type of the first image is a code image, and after the terminal starts to recognize a graphic code included in at least one frame of an image in the image stream frame by frame, if no graphic code is recognized and obtained within a given time, it is possible that the actual image type of the first image is not a code image, or in this case, the user does not intend to recognize a code image. In this case, the terminal may obtain a new first image, and perform recognition on the images in the image stream according to a recognition manner corresponding to the image type of the new first image.

Figure 8:
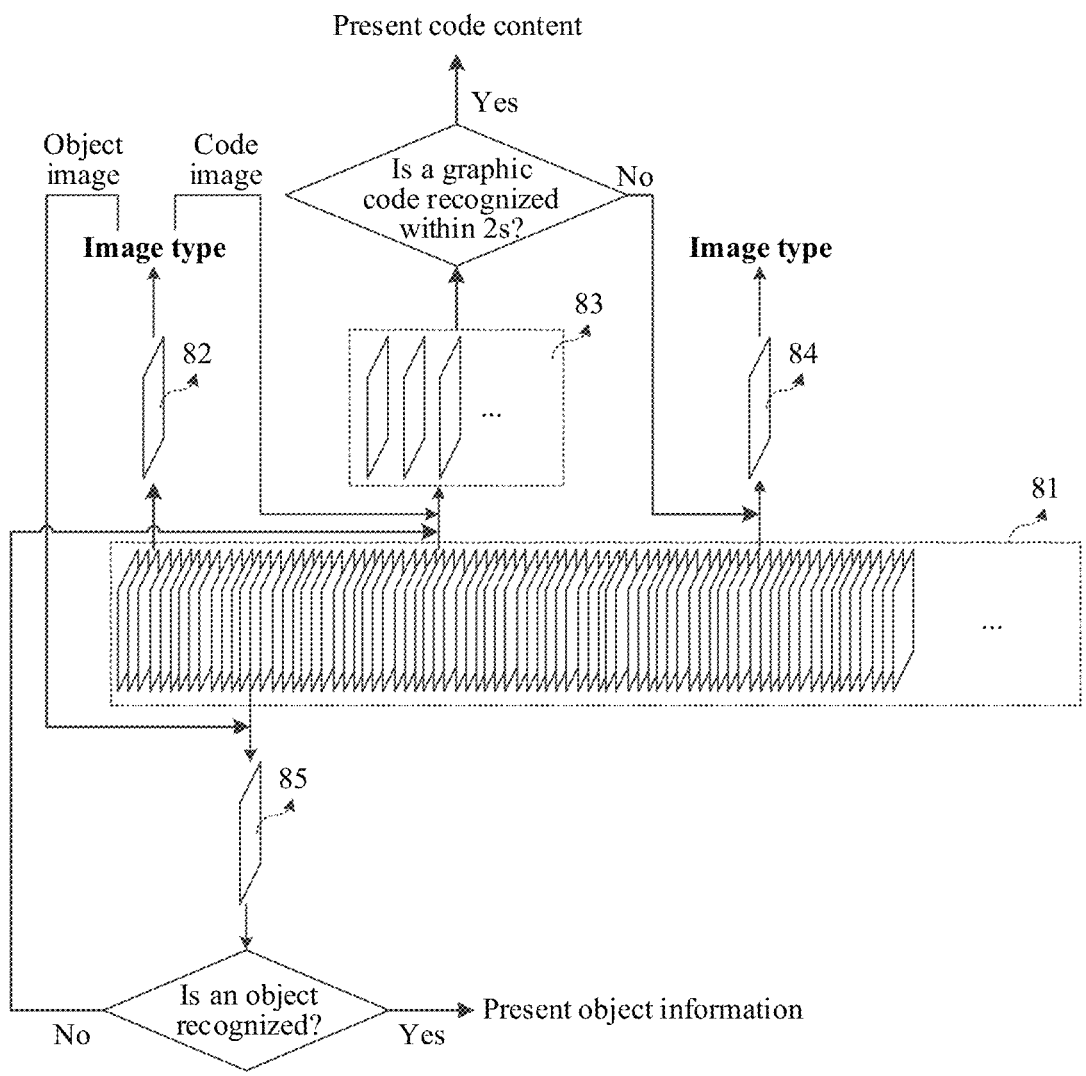
FIG. 8 is a schematic diagram of an image recognition process included in the embodiment of FIG. 4.

For example, FIG. 8 is a schematic diagram of an image recognition process included in this embodiment of this application. As shown in FIG. 8, after the terminal starts to collect and obtain an image stream 81 by using the image collection component, the terminal first extracts a first image 82 from the image stream 81, and determines an image type of the first image 82.

When the image type of the first image 82 is a code image, the terminal extracts at least one frame of an image 83 from the image stream 81, and recognizes a graphic code in the extracted at least one frame of the image 83 frame by frame in order of collection time. If the terminal recognizes that the at least one frame of the image 83 includes a graphic code within a preset time (e.g., 2 s), the terminal presents code content included in the graphic code. If the terminal fails to recognize that the at least one frame of the image 83 includes a graphic code within the preset time, the terminal may obtain a new first image 84, and repeat the foregoing steps.

When the image type of the first image 82 is an object image, the terminal extracts a second image 85 from the image stream 81, and recognizes an object included in the second image 85 by using a cloud server, to obtain a first recognition result. If the first recognition result indicates that the second image 85 includes an object, corresponding object information is presented. If the first recognition result indicates that recognition on the object included in the second image 85 fails, the terminal may perform the foregoing step of extracting at least one frame of an image 83 and recognizing a graphic code in the at least one frame of the image 83 frame by frame. Alternatively, in another possible implementation, when the first recognition result indicates that recognition on the object included in the second image 85 fails, the terminal may further recognize a graphic code included in the second image 83, and if the graphic code is successfully recognized, the terminal presents code content included in the graphic code.

In conclusion, through the solution shown in this embodiment of this application, only one entry control needs to be provided in an application interface, and recognition on two types of images, namely, an object image and a code image, can be triggered without respectively setting entry controls for the two types of images, so that operation steps of the user during switching for recognition on images of different types can be simplified, thereby improving efficiency of switching for recognition on images of different types.

In addition, through the solution shown in this embodiment of this application, when the first image is determined as an object image, but no object is successfully recognized in the extracted second image, the terminal may further perform graphic code recognition on the second image, to recognize whether the second image includes a graphic code, and code content included in the graphic code, thereby preventing a problem that the graphic code cannot be recognized because the first image is wrongly determined as an object image, and improving accuracy of image recognition.

In addition, through the solution shown in this embodiment of this application, when the first image is determined as a code image, but no graphic code is successfully recognized within a preset time, the terminal may obtain a new first image, determine the image type again, and perform object image recognition or code image recognition according to the image type, thereby preventing a problem that the object in the image cannot be recognized because the first image is wrongly determined as a code image, and improving accuracy of image recognition.

Through the embodiment shown in FIG. 4, the terminal may present a recognition entry control, and present an image view-finding interface when receiving a preset operation performed on the recognition entry control, the image view-finding interface being an interface used for displaying an image obtained through real-time view-finding by the image collection component. Further, after performing recognition on the image in the image view-finding interface, the terminal further presents an image type of the image included in the image stream collected and obtained by the image collection component, and a recognition result corresponding to the image type, the image type including an object image or a code image. From the perspective of a user side, a single recognition entry is presented by the terminal, after the user triggers a recognition process by using the recognition entry, if the user scans an object by using the image collection component in the terminal, the terminal may present information such as a name of the object. If the user scans a graphic code (e.g., a two-dimensional barcode) by using the image collection component in the terminal, the terminal may present content carried in the graphic code.

In the embodiment shown in FIG. 4, after the terminal determines that the first image is an object image, if no object information is successfully recognized from the second image subsequently, the terminal performs code image recognition on the second image again. The procedure needs to consume a specific processing time. That is, when the user intends to recognize a graphic code, if the terminal wrongly determines the first image as an object image, the terminal needs to first perform object image recognition on the second image, and then, perform, when the recognition fails, code image recognition on the second image. Consequently, a recognition delay for the graphic code is relatively long. In the solutions shown in this application, the recognition delay for the graphic code in the foregoing case may be shortened by using a method shown in FIG. 9.

Figure 9:
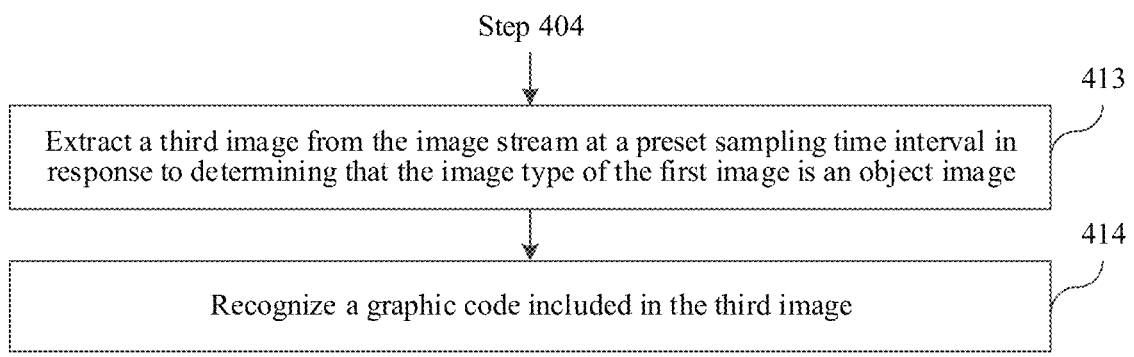
FIG. 9 is a flowchart of an image recognition method according to an exemplary embodiment.

FIG. 9 is a flowchart of an image recognition method according to an exemplary embodiment. The image recognition method may be used in a terminal. For example, the method may be used in the terminal 120 shown in FIG. 1. Based on FIG. 4, as shown in FIG. 9, the image recognition method may include the following steps.

In step 413, a third image from the image stream is extracted at a preset sampling time interval in response to determining that the image type of the first image is an object image.

In this embodiment of this application, when the first image is determined as an object image through step 404 in the foregoing embodiment shown in FIG. 4, the terminal, while performing steps 405 to 408, further extracts a third image from the image stream at a preset sampling time interval.

A manner of extracting, by the terminal, the third image from the image stream is similar to the manner of extracting, by the terminal, the second image according to the preset extraction condition in the embodiment in FIG. 4, and details are not described herein again.

In step 414, a graphic code included in the third image is recognized.

After each time the third image is extracted, the terminal may recognize whether the third image includes a graphic code, and decode and obtain, when the third image includes a graphic code, code content included in the graphic code and present the code content. If the graphic code included in the third image is successfully recognized and decoded, the terminal may end the current image recognition process.

In conclusion, through the solution shown in this embodiment of this application, after the first image is determined as an object image, in a procedure of extracting the second image and recognizing an object included in the second image, the terminal further extracts one frame of an image at a time interval, to recognize a graphic code, thereby preventing a problem that a delay of finally recognizing the graphic code is excessively long because the first image is wrongly determined as an object image, and improving recognition efficiency of the graphic code.

In the embodiments in FIG. 4 and FIG. 9, only an example in which the user triggers recognizing an object image and a graphic code image through a recognition entry control is used for description. In an actual application, the user may alternatively trigger recognizing an object image and a graphic code image through a single operation that does not rely on a recognition entry control. In a solution in which the user simultaneously triggers recognizing an object image and a graphic code image through a single operation that does not rely on a recognition entry control, the procedure of performing recognition on the image is similar to the foregoing image recognition procedure shown in FIG. 4 and FIG. 9, and details are not described herein again.

Figure 10:
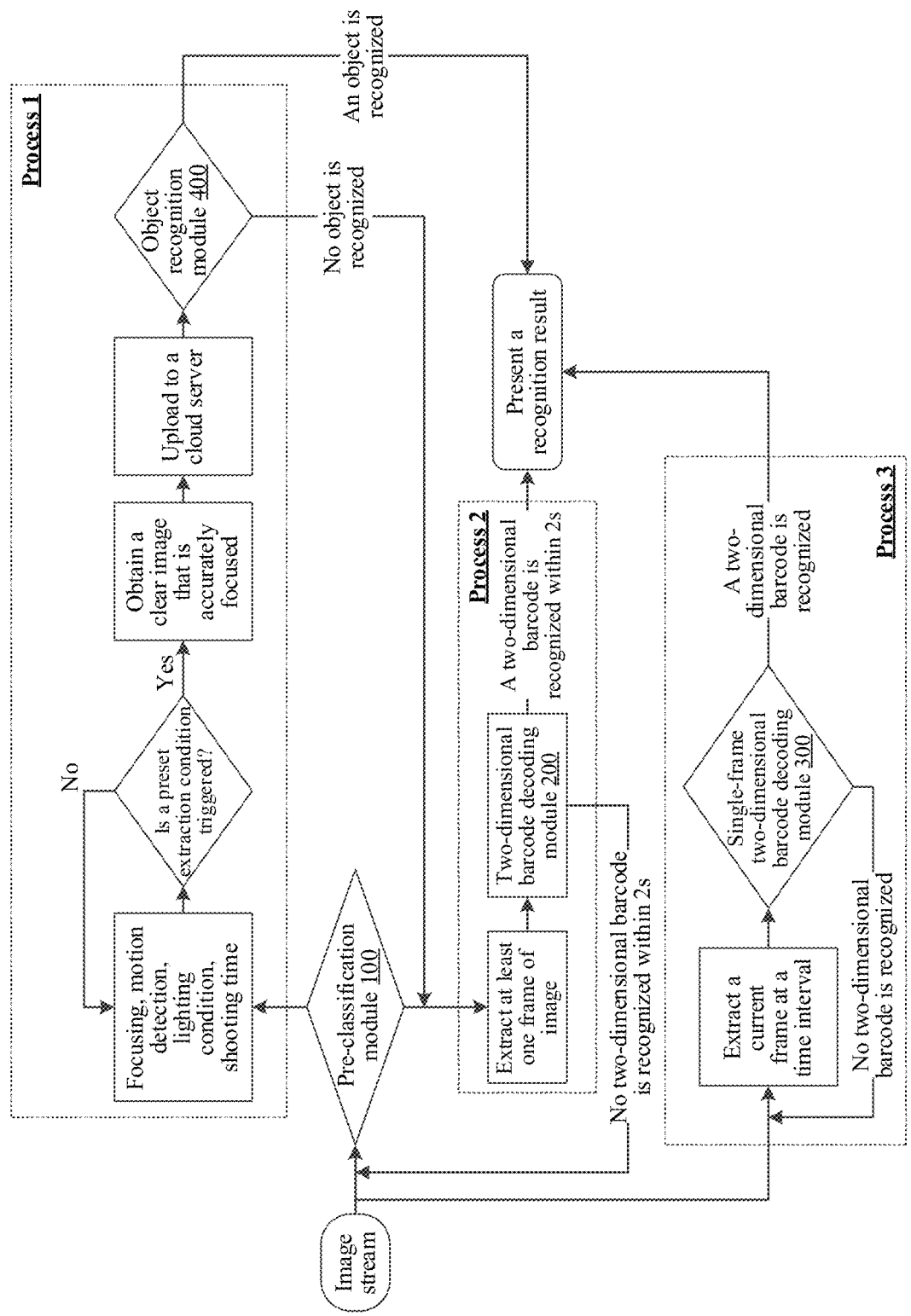
FIG. 10 is an architectural diagram of an implementation of an image recognition system according to an exemplary embodiment.

FIG. 10 is an architectural diagram of an implementation of an image recognition system according to an exemplary embodiment. One or more of the modules in the system can be implemented by processing circuitry. Using an example in which the graphic code is a two-dimensional barcode, modules in the system are as follows.

A pre-classification module 100 is a module configured to recognize whether a current image is a two-dimensional barcode.

A two-dimensional barcode decoding module 200 is a module configured to recognize and decode a two-dimensional barcode by using an image stream collected by an image collection component, where a decoding success rate is high.

A single-frame two-dimensional barcode decoding module 300 is a module configured to recognize and decode a two-dimensional barcode by using a single frame of an image, where a decoding speed is high.

An object recognition module 400 is a module configured to perform object recognition by using the image stream collected by the image collection component.

In an actual application, if two-dimensional barcode decoding and object recognition are directly combined (e.g., the image stream is directly inputted into the two-dimensional barcode decoding module 200 and the object recognition module 400), the modules both perform image processing, resulting in impact on performance of the terminal. Consequently, a speed and accuracy of recognizing a two-dimensional barcode are greatly reduced. In addition, framing judgment (e.g., extracting the second image) and image presentation of object recognition are also affected. That is, if image data is simply transmitted to the two modules for processing, in a current hardware condition of the terminal, experience of both two-dimensional barcode decoding and object recognition is affected.

The pre-classification module 100 has a specific misjudgment rate, and there is a probability that no two-dimensional barcode is recognized or another object that is not a two-dimensional barcode is recognized as a two-dimensional barcode. Therefore, if alternative processing is simply performed by using the pre-classification module, although the performance problem may be resolved, a two-dimensional barcode recognition failure or an object recognition failure may be caused.

The two-dimensional barcode decoding module 200 differs from the single-frame two-dimensional barcode decoding module 300 in that: the two-dimensional barcode decoding module 200 recognizes an image stream, may determine and decode a two-dimensional barcode according to information of previous and next frames, and has the highest recognition rate. However, a recognition processing procedure usually takes more than 100 ms, and has a relatively high processor occupancy rate. The single-frame two-dimensional barcode decoding module 300 receives a single frame of an image, recognizes and decodes a two-dimensional barcode based on the single frame of the image, and has a recognition rate lower than that of the two-dimensional barcode decoding module 200, but has a very low processor occupancy rate, and a high processing speed.

Moreover, in the solution shown in FIG. 10, the foregoing pre-classification module 100, the two-dimensional barcode decoding module 200, and single-frame two-dimensional barcode decoding module 300 may be combined, to improve accuracy and speeds of two-dimensional barcode recognition and object recognition. The foregoing recognition processes are as follows:

Process 1: In an object recognition process shown in FIG. 10, after the terminal enables the image collection component, the image stream is continuously transmitted to the pre-classification module. If the pre-classification module determines that the first image in the image stream is not a two-dimensional barcode, the object recognition process (e.g., the process 1) is performed on the image stream, a preset algorithm in the terminal determines whether the user already aims at an object that the user is interested in according to information such as focusing data of the image collection component, feedback from a motion sensor indicating whether the terminal significantly moves, whether the lighting condition is suitable, and whether a shooting time reaches a threshold. If a preset extraction condition is triggered, a clear image (e.g., the second image) that is accurately focused is transmitted to a cloud server for object recognition. Alternatively, the terminal may control, according to a touch operation of the user, the image collection component to automatically focus and select a clear image, and transmit the image to the cloud server for object recognition. If the cloud server recognizes the object, a recognition result is returned, and the entire process ends. If the cloud server fails to recognize the object, the terminal is notified. The terminal transmits the image stream to a two-dimensional barcode recognition module, to switch from the process 1 to a process 2. Alternatively, the terminal may transfer the second image to a single-frame two-dimensional barcode recognition module for two-dimensional barcode recognition. If the two-dimensional barcode in the second image is successfully recognized, the entire recognition process ends.

Process 2: After the terminal enables the image collection component, the image stream is continuously transmitted to the pre-classification module. After the pre-classification module determines that the first image in the image stream is a two-dimensional barcode, the process 2 is entered. That is, the terminal extracts at least one frame of an image from the image stream, and inputs the at least one frame of the image into the two-dimensional barcode recognition module. The two-dimensional barcode recognition module recognizes the two-dimensional barcode in the at least one frame of the image and performs decoding.

For a case in which the pre-classification module incorrectly recognizes an object that is not a two-dimensional barcode as a two-dimensional barcode, if no processing is performed, the terminal always performs the process 2 without returning to an initial state for correction. As shown in FIG. 10, in this embodiment of this application, a maximum execution time (e.g., 2 seconds) of the process 2 may be set. If no two-dimensional barcode is recognized within 2 seconds, the image stream enters the pre-classification module again for determining. If a two-dimensional barcode is recognized within 2 seconds, the entire recognition process ends.

Because the pre-classification module is introduced, the process 1 and the process 2 are mutually exclusive, and only one process is run at the same time. Not only a problem of excessively high processor occupancy rate is resolved, but also a corresponding fault tolerance mechanism is added to both processes, to deal with two types of mistakes of the pre-classification module. The first type of mistake is that, originally, a two-dimensional barcode is included, but the object recognition process is entered. In this case, the terminal determines, according to the recognition result of the process 1, whether to switch to the process 2, thereby further reducing a probability of the problem that no two-dimensional barcode is recognized because of this mistake. The second type of mistake is that, an object is wrongly recognized as a two-dimensional barcode. In this case, the terminal uses a timeout time to reset the process, and ensures that an object that is not a two-dimensional barcode may return back to a pre-classification algorithm for determining in the two-dimensional barcode recognition process.

However, there is still a problem in the process 1 and the process 2, that is, when the first type of mistake occurs, a two-dimensional barcode image needs to be transmitted to the cloud server after being processed through image extraction, and returned to the terminal after being recognized by the cloud server, and the terminal performs two-dimensional barcode recognition, which usually consumes a relatively long time. Once this type of problem occurs, the user needs to spend a relatively lone time to aim the image collection component at the two-dimensional barcode for recognition. To resolve this problem, a process 3 below is newly added to this application.

Process 3: While the process 1 and the process 2 are run, the terminal may extract a current frame in the image stream at a relatively short time interval (such as 500 ms), and transmit the current frame that is extracted to the single-frame two-dimensional barcode recognition module, for direct two-dimensional barcode recognition. If there is a result for two-dimensional barcode recognition, the entire algorithm ends. This process may ensure that there is an opportunity of two-dimensional barcode recognition every 500 ms, thereby improving a recognition speed when a two-dimensional barcode is wrongly recognized as an object as described above.

In the solution shown in this application, the foregoing three processes are combined, thereby improving an entire success rate of two-dimensional barcode recognition, while ensuring that object recognition may be normally performed and providing a specific mistake correction mechanism.

Figure 11:
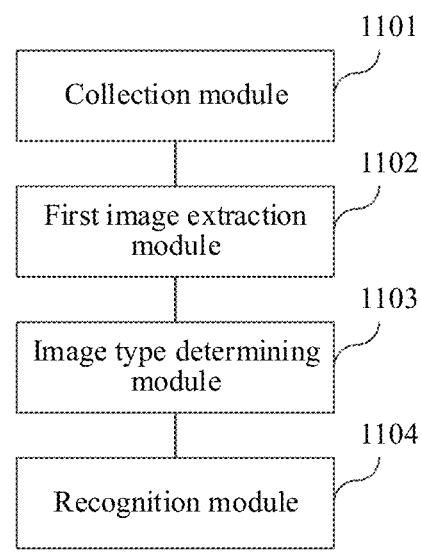
FIG. 11 is a structural block diagram of an image recognition apparatus according to an exemplary embodiment.

FIG. 11 is a structural block diagram of an image recognition apparatus according to an exemplary embodiment. The image recognition apparatus may be applied to the terminal 120 included in the system shown in FIG. 1, to perform all or some steps of the method provided in the embodiment shown in FIG. 2, FIG. 4, or FIG. 9. The image recognition apparatus may include a collection module 1101, a first image extraction module 1102, an image type determining module 1103, and a recognition module 1104. One or more of the module can be implemented by processing circuitry.

The collection module 1101 is configured to enable an image collection component in response to receiving an operation of enabling image recognition, to collect and obtain an image stream.

The first image extraction module 1102 is configured to extract a first image from the image stream.

The image type determining module 1103 is configured to determine an image type of the first image, the image type including an object image or a code image.

The recognition module 1104 is configured to perform recognition on the image in the image stream according to a recognition manner corresponding to the image type.

In some embodiments, the recognition module 1104 is specifically configured to:

extract a second image from the image stream in a case that the image type of the first image is an object image;

transmit a recognition request to a recognition server, the recognition request being used for requesting the server to recognize an object included in the second image; and receive a first recognition result returned by the server.

In some embodiments, the recognition module 1104 is further configured to:

recognize a graphic code included in the second image in a case that the first recognition result indicates that the server fails to recognize the second image; or recognize a graphic code included in at least one frame of an image in the image stream frame by frame in chronological order by corresponding collection time in a case that the first recognition result indicates that the server fails to recognize the second image.

In some embodiments, when extracting a second image from the image stream, the recognition module 1104 is specifically configured to:

present an image view-finding interface, the image view-finding interface being an interface used for displaying an image obtained through real-time view-finding by the image collection component;

determine a focusing parameter of the image collection component according to a focusing operation performed in the image view-finding interface; and extract an image collected by the image collection component according to the focusing parameter as the second image.

In some embodiments, when extracting a second image from the image stream, the recognition module 1104 is specifically configured to obtain, from the image stream, a target image satisfying a preset extraction condition as the second image.

In some embodiments, the preset extraction condition includes at least one of the following conditions:

a difference value between the target image and a reference image is less than a preset difference threshold, the difference value being used for indicating a difference between two frames of images, and the reference image being an image that is in the image stream and that is located at a preset relative location of the target image;

ambient light luminance at a collection moment corresponding to the target image is greater than a preset luminance threshold;

terminal acceleration at the collection moment corresponding to the target image is less than a preset acceleration threshold; and the collection moment corresponding to the target image is after a first moment, and duration between the collection moment and the first moment is greater than a preset duration threshold, the first moment being a moment at which the first image is collected.

In some embodiments, the recognition module 1104 is further configured to: extract a third image from the image stream at a preset sampling time interval; and recognize a graphic code included in the third image.

In some embodiments, the recognition module 1104 is specifically configured to recognize a graphic code included in at least one frame of an image in the image stream frame by frame in chronological order by corresponding collection time in a case that the image type of the first image is a code image.

In some embodiments, the first image extraction module 1102 is further configured to extract a new first image from the image stream in response to failing to recognize the graphic code within a time period of a preset length after an initial recognition moment.

The image type determining module 1103 is further configured to determine an image type of the new first image.

The recognition module is further configured to perform recognition on the image in the image stream according to a recognition manner corresponding to the image type of the new first image.

In some embodiments, the image type determining module 1103 is specifically configured to:

obtain a probability that the first image is a code image;

determine that the first image is a code image in a case that the probability is greater than a preset probability threshold; and determine that the first image is an object image in a case that the probability is less than or equal to the probability threshold.

In some embodiments, when obtaining a probability that the first image is a code image, the image type determining module 1103 is specifically configured to: input the first image into an image classification model, to obtain the probability that the first image is a code image, the image classification model being a machine learning model obtained by training through a training sample, the training sample including a sample image pre-labeled as a code image.

In conclusion, through the apparatus shown in this embodiment of this application, a user only needs to perform an operation of enabling image recognition to trigger recognition on two types of images, namely, an object image and a code image, without respectively setting entry controls for the two types of images, so that operation steps of the user during switching for recognition on images of different types can be simplified, thereby improving efficiency of switching for recognition on images of different types.

In addition, through the apparatus shown in this embodiment of this application, when the first image is determined as an object image, but no object is successfully recognized in the extracted second image, the terminal may further perform graphic code recognition on the second image, to recognize whether the second image includes a graphic code, and code content included in the graphic code, thereby preventing a problem that the graphic code cannot be recognized because the first image is wrongly determined as an object image, and improving accuracy of image recognition.

In addition, through the apparatus shown in this embodiment of this application, when the first image is determined as a code image, but no graphic code is successfully recognized within a preset time, the terminal may obtain a new first image, determine the image type again, and perform object image recognition or code image recognition according to the image type, thereby preventing a problem that the object in the image cannot be recognized because the first image is wrongly determined as a code image, and improving accuracy of image recognition.

In addition, through the apparatus shown in this embodiment of this application, after the first image is determined as an object image, in a procedure of extracting the second image and recognizing an object included in the second image, the terminal further extracts one frame of an image at a time interval, to recognize a graphic code, thereby preventing a problem that a delay of finally recognizing the graphic code is excessively long because the first image is wrongly determined as an object image, and improving recognition efficiency of the graphic code.

Figure 12:
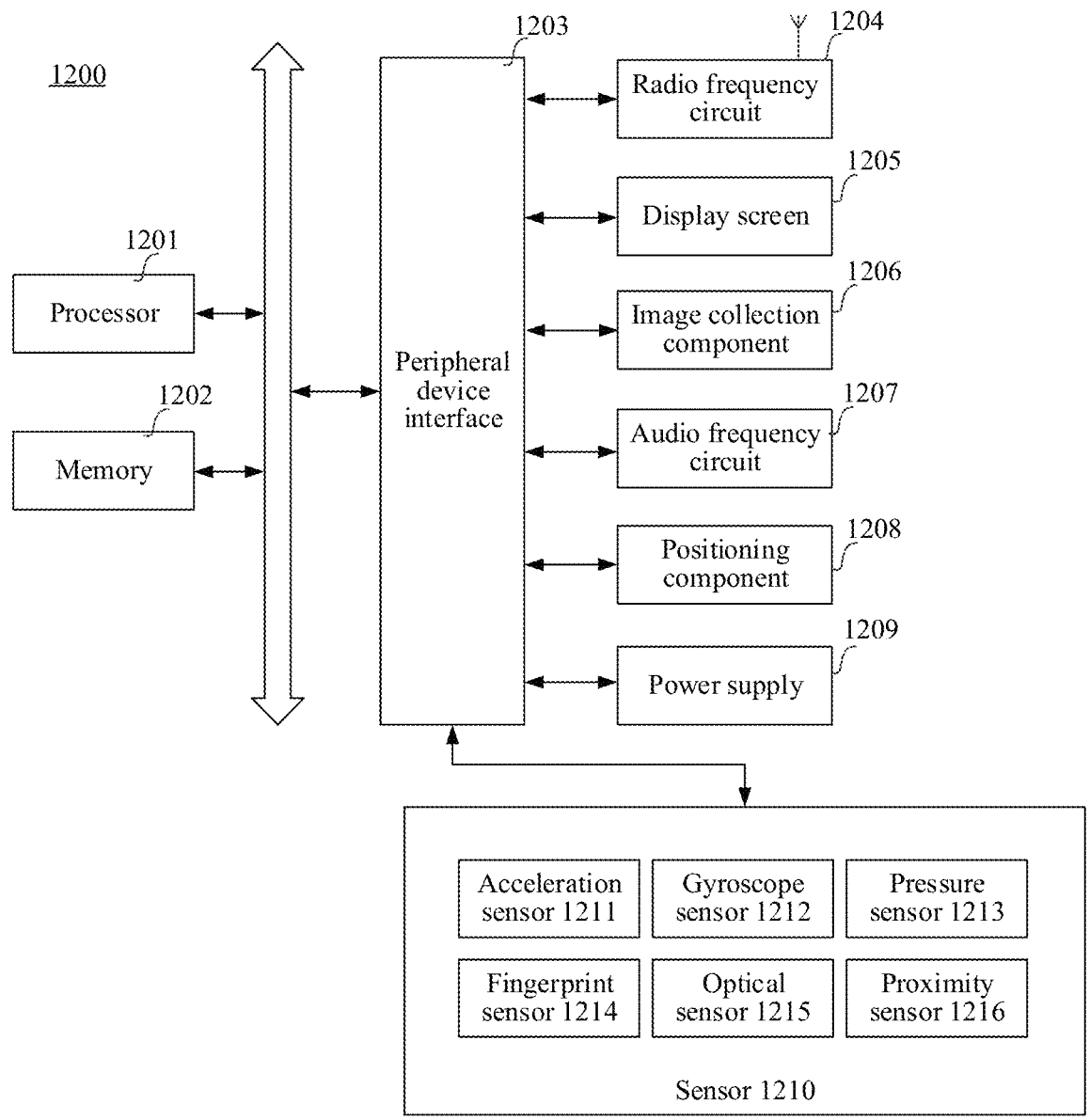
FIG. 12 is a schematic structural diagram of a terminal according to an exemplary embodiment.

FIG. 12 is a structural block diagram of a terminal 1200 according to an exemplary embodiment. The terminal 1200 may be a user terminal, for example, a smartphone, a tablet computer, an e-book reader, smart glasses, a smartwatch, an MP3 player, an MP4 player, a notebook computer, or a desktop computer. The terminal 1200 may also be referred to as another name such as user equipment, a portable terminal, a laptop terminal, or a desktop terminal.

Generally, the terminal 1200 includes a processor 1201 and a memory 1202.

The processor 1201 (e.g., processing circuitry) includes one or more processing cores, and is, for example, a 4-core processor or an 8-core processor. The processor 1201 may be implemented by at least one hardware form of a digital signal processor (DSP), a field-programmable gate array (FPGA), and a programmable logic array (PLA). The processor 1201 may alternatively include a main processor and a coprocessor. The main processor is configured to process data in an awake state, also referred to as a central processing unit (CPU), and the coprocessor is a low-power processor configured to process data in an idle state. In some embodiments, the processor 1201 may be integrated with a graphics processing unit (GPU). The GPU is responsible for rendering and drawing content to be displayed by a display screen.

The memory 1202 may include one or more computer-readable storage media. The computer-readable storage media may be a non-transitory computer-readable storage medium. The memory 1202 may further include a high-speed random access memory, and a non-volatile memory such as one or more magnetic disk storage devices and a flash memory device. In some embodiments, the non-transitory computer-readable storage medium in the memory 1202 is configured to store at least one instruction. The at least one instruction is executed by the processor 1201 to implement the image recognition method provided in the method embodiment in this application.

In some embodiments, the terminal 1200 may further optionally include a peripheral device interface 1203 and at least one peripheral device. The processor 1201, the memory 1202, and the peripheral device interface 1203 may be connected through a bus or a signal cable. Each peripheral device may be connected to the peripheral device interface 1203 through a bus, a signal cable, or a circuit board. Specifically, the peripheral device includes: at least one of a radio frequency (RF) circuit 1204, a touch display screen 1205, an image collection component 1206, an audio frequency circuit 1207, a positioning component 1208, and a power supply 1209.

The image collection component 1206 is configured to collect an image or a video. Optionally, the image collection component 1206 includes a front-facing camera and a rear-facing camera. Generally, the front-facing camera is disposed on the front panel of the terminal, and the rear-facing camera is disposed on a back face of the terminal.

In some embodiments, the terminal 1200 further includes one or more sensors 1210. The one or more sensors 1210 include, but are not limited to, an acceleration sensor 1211, a gyroscope sensor 1212, a pressure sensor 1213, a fingerprint sensor 1214, an optical sensor 1215, and a proximity sensor 1216.

A person skilled in the art may understand that the structure shown in FIG. 12 does not constitute a limitation to the terminal 1200, and the terminal may include more components or fewer components than those shown in the figure, or some components may be combined, or a different component deployment may be used.

Figure 13:
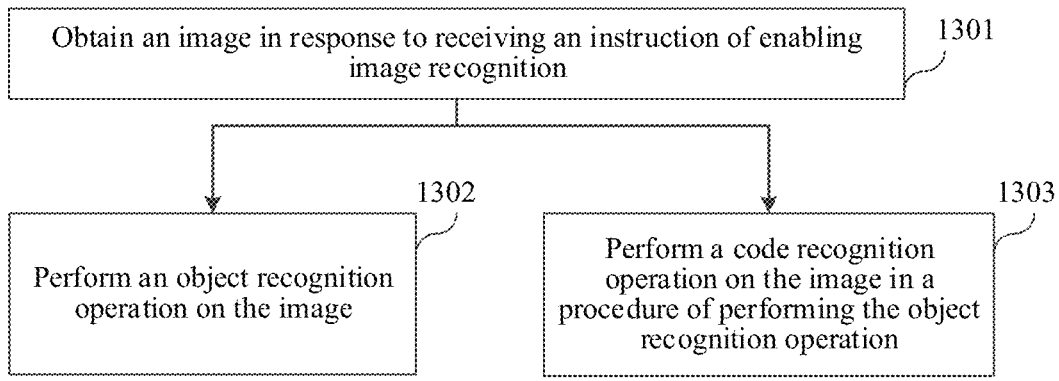
FIG. 13 is a flowchart of an image recognition method according to an exemplary embodiment.

In some other embodiments, when image recognition is enabled, an object image recognition operation and a code image recognition operation may be simultaneously performed. FIG. 13 is a flowchart of an image recognition method according to an embodiment of this application. The method may be performed by a terminal, for example, the terminal 120 shown in FIG. 1. As shown in FIG. 13, the method may include the following steps.

In step 1301, an image is obtained in response to receiving an instruction of enabling image recognition.

The instruction of enabling image recognition may be an instruction triggered by a key, an instruction triggered by voice, an instruction triggered by a touch operation, or the like.

The terminal may obtain the image in various feasible manners. For example, the image may be collected by using an image collection component of the terminal, for example, a photograph is captured or an image stream is collected in real time. For another example, an image stored in the terminal may be obtained. The stored image may be a single image (e.g., an image in a JPG format or an image in a BMP format), or may be a dynamic image (e.g., a dynamic image in a GIF format including data of a plurality of images) including a plurality of images, or may be video images including data of a plurality of frames of images, or the like.

In step 1302, an object recognition operation is performed on the image. The object recognition operation may be used for recognizing an object presented in the image.

When the image stream is collected by using the image collection component in real time, one frame of an image may be selected from the image stream for object recognition according to the conditions described above, for example, the difference threshold, the luminance threshold, the acceleration threshold, and the duration threshold. The object recognition operation herein may be the object recognition procedure in the foregoing embodiments, and details are not described herein again.

In step 1303, a code recognition operation is performed on the image in a procedure of performing the object recognition operation. The code recognition operation herein may be used for recognizing a graphic code presented in the image.

For the code recognition operation, various feasible code recognition methods may be used, for example, the various code recognition methods used in the foregoing embodiments. In some embodiments, a used code recognition method may be preset in the terminal. In some embodiments, the terminal may select one for execution from a plurality of preset code recognition methods according to performance of the terminal or a current execution condition. For example, when performance of the terminal reaches a preset condition, a code recognition method that has a high recognition rate and that consumes more resources may be used; and when performance of the terminal does not reach the preset condition, a code recognition method that has a relatively low recognition rate and that consumes fewer resources may be used.

In some embodiments, when the image includes a plurality of image frames, a code recognition operation based on an image stream may be performed on the image. In the code recognition operation based on an image stream, a graphic code may be recognized by using a plurality of frames of images in the image stream. For example, one image frame may be extracted from the image stream for code recognition, and if no graphic code is recognized, another image frame is extracted from the image stream for code recognition.

In some embodiments, when the image includes a plurality of image frames, the terminal may alternatively perform a code recognition operation based on a single frame of an image on the image. For example, the terminal may extract one image frame from the image at a preset time interval, and perform a code recognition operation based on a single frame of an image on the image frame.

In some embodiments, an end condition of the code recognition operation may be set. For example, when recognition does not succeed after preset duration, execution of the code recognition operation ends.

When recognition results are returned respectively for the object recognition operation and the code recognition operation, a recognition result may be outputted according to a preset rule. For example, when an object and a graphic code are recognized from the image, an object recognition result and a code recognition result may be both presented, or the object recognition result or the code recognition result may be presented according to a preset priority.

In this way, the object recognition operation and the code recognition operation are performed simultaneously, so that image recognition operations of the user can be simplified, and operation efficiency of the user can be improved.

In an exemplary embodiment, a computer-readable storage medium including an instruction, for example, a memory including a computer program (an instruction), is further provided, and the program (the instruction) may be executed by a processor in a server to perform the image recognition method in each embodiment of this application. For example, the computer-readable storage medium may be a ROM, a random access memory (RAM), a CD-ROM, a magnetic tape, a floppy disk, an optical data storage device, or the like.

After considering the specification and practicing the present disclosure, a person skilled in the art would easily conceive of other implementations of this application. This application is intended to cover any variation, use, or adaptive change of this application. The variations, uses, or adaptive changes follow the general principles of this application and include common general knowledge or common technical means in the art that are not disclosed in this application. The specification and the embodiments are considered as merely exemplary, and the real scope and spirit of this application are pointed out in the following claims.

To sum up, the scope of the claims is not to be limited to the implementations in the examples described above, and the specification is to be considered as an entirety and explained in the broadest sense.

What is claimed is:

1. An image recognition method of a terminal, the method comprising:
   controlling, by processing circuitry of the terminal, an image sensor to capture an image stream in response to receiving an image recognition trigger;
   extracting, by the processing circuitry, a first image from the image stream;
   determining, by the processing circuitry, whether an image type of the first image is one of an object image and a code image; and
   performing, by the processing circuitry, one of a plurality of recognition processes on a second image in the image stream according to the determined image type, wherein
   a first recognition process of the plurality of recognition processes is performed based on the image type of the first image being the object image, and
   a second recognition process of the plurality of recognition processes is performed based on the image type of the first image being the code image.

2. The method according to claim 1, wherein the performing one of the plurality of recognition processes on the second image comprises:
   extracting the second image from the image stream in a case that the image type of the first image is the object image;
   transmitting a recognition request to a recognition server that is configured to recognize an object in the second image; and
   receiving a first recognition result from the recognition server.

3. The method according to claim 2, further comprising:
   recognizing a graphic code in the second image or a third image in the image stream in a case that the first recognition result indicates that the recognition server fails to recognize the object in the second image.

4. The method according to claim 2, wherein the extracting the second image from the image stream comprises:
   presenting an image view-finding interface, the image view-finding interface being configured to display a real-time image obtained by the image sensor;
   determining a focusing parameter according to a focusing operation performed via the image view-finding interface; and
   extracting the second image captured by the image sensor according to the focusing parameter.

5. The method according to claim 2, wherein the extracting the second image from the image stream comprises:
   obtaining, from the image stream, a target image satisfying a preset extraction condition as the second image.

6. The method according to claim 5, wherein the preset extraction condition comprises at least one of:
   a difference value between the target image and a reference image in the image stream is less than a preset difference threshold, the reference image being located at a preset location that is relative to the target image;
   ambient light luminance at a capture time corresponding to the target image is greater than a preset luminance threshold;
   terminal acceleration at the capture time corresponding to the target image is less than a preset acceleration threshold; or
   the capture time corresponding to the target image is after a first time corresponding to a time the first image is captured, and a duration between the capture time and the first time is greater than a preset duration threshold.

7. The method according to claim 2, further comprising:
   extracting a third image from the image stream at a preset sampling time interval; and
   recognizing a graphic code in the third image.

8. The method according to claim 2, wherein the performing one of the plurality of recognition processes on the second image comprises:
   performing recognition of a graphic code in a plurality of images in the image stream in order of capture time in a case that the image type of the first image is the code image.

9. The method according to claim 8, further comprising:
   extracting a third image from the image stream in response to failing to recognize the graphic code within a time period of a preset length after an initial recognition time;
   determining whether an image type of the third image is one of the object image and the code image; and
   performing recognition on a fourth image in the image stream according to the determined image type of the third image.

10. The method according to claim 1, wherein the determining the image type of the first image comprises:
    obtaining a probability that the first image includes the code image;
    determining that the first image includes the code image in a case that the probability is greater than a preset probability threshold; and
    determining that the image type of the first image is the object image in a case that the probability is less than or equal to the preset probability threshold.

11. The method according to claim 10, wherein the obtaining the probability that the first image includes the code image comprises:
    inputting the first image into an image classification model, to obtain the probability that the first image includes the code image, the image classification model being a machine learning model that is trained with a sample image pre-labeled as a code image.

12. An image recognition apparatus, comprising:
    processing circuitry configured to
    control an image sensor to capture an image stream in response to receiving an image recognition trigger;
    extract a first image from the image stream;
    determine whether an image type of the first image is one of an object image and a code image; and
    perform one of a plurality of recognition processes on a second image in the image stream according to the determined image type, wherein
    a first recognition process of the plurality of recognition processes is performed based on the image type of the first image being the object image, and
    a second recognition process of the plurality of recognition processes is performed based on the image type of the first image being the code image.

13. The image recognition apparatus according to claim 12, wherein the processing circuitry is configured to extract the second image from the image stream in a case that the image type of the first image is the object image;
transmit a recognition request to a recognition server that is configured to recognize an object in the second image; and
receive a first recognition result from the recognition server.

14. The image recognition apparatus according to claim 13, wherein the processing circuitry is configured to
recognize a graphic code in the second image or a third image in the image stream in a case that the first recognition result indicates that the recognition server fails to recognize the object in the second image.

15. The image recognition apparatus according to claim 13, wherein the processing circuitry is configured to
present an image view-finding interface, the image view-finding interface being configured to display a real-time image obtained by the image sensor;
determine a focusing parameter according to a focusing operation performed via the image view-finding interface; and
extract the second image captured by the image sensor according to the focusing parameter.

16. The image recognition apparatus according to claim 13, wherein the processing circuitry is configured to
obtain, from the image stream, a target image satisfying a preset extraction condition as the second image.

17. The image recognition apparatus according to claim 16, wherein the preset extraction condition comprises at least one of:
a difference value between the target image and a reference image in the image stream is less than a preset difference threshold, the reference image being located at a preset location that is relative to the target image;
ambient light luminance at a capture time corresponding to the target image is greater than a preset luminance threshold;
terminal acceleration at the capture time corresponding to the target image is less than a preset acceleration threshold; or
the capture time corresponding to the target image is after a first time corresponding to a time the first image is captured, and a duration between the capture time and the first time is greater than a preset duration threshold.

18. The image recognition apparatus according to claim 13, wherein the processing circuitry is configured to
extract a third image from the image stream at a preset sampling time interval; and
recognize a graphic code in the third image.

19. The image recognition apparatus according to claim 13, wherein the processing circuitry is configured to
perform recognition of a graphic code in a plurality of images in the image stream in order of capture time in a case that the image type of the first image is the code image.

20. A non-transitory computer-readable storage medium storing instructions which when executed by a processor cause the processor to perform an image recognition method, the method comprising:
controlling an image sensor to capture an image stream in response to receiving an image recognition trigger;
extracting a first image from the image stream;
determining whether an image type of the first image is one of an object image and a code image; and
performing one of a plurality of recognition processes on a second image in the image stream according to the determined image type, wherein
a first recognition process of the plurality of recognition processes is performed based on the image type of the first image being the object image, and
a second recognition process of the plurality of recognition processes is performed based on the image type of the first image being the code image.

* * * * *

UNITED STATES PATENT AND TRADEMARK OFFICE
CERTIFICATE OF CORRECTION

PATENT NO. : 10,902,234 B2  
APPLICATION NO. : 16/893300  
DATED : January 26, 2021  
INVENTOR(S) : Zhou Feng et al.

Page 1 of 1

It is certified that error appears in the above-identified patent and that said Letters Patent is hereby corrected as shown below:

In the Claims

Column 23, Line 19, please change "determining, by the processing circuitry," to --determining--.

Column 23, Line 22, please change "performing, by the processing circuitry," to --performing--.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*